United States Patent [19]

Nagano et al.

[11] Patent Number: 5,550,999
[45] Date of Patent: Aug. 27, 1996

[54] INFORMATION PROCESSING SYSTEM WHICH CAN CHECK SECONDARY STORAGE MEDIUM HAVING PRESCRIBED RELATION THEREWITH AND SECONDARY STORAGE DEVICE THEREFOR

[75] Inventors: Masakazu Nagano; Kunihiro Tanaka; Toshiro Hibino; Hiroshi Sato, all of Kyoto, Japan

[73] Assignee: Nintendo Co., Ltd., Kyoto, Japan

[21] Appl. No.: 155,780

[22] Filed: Nov. 23, 1993

[30] Foreign Application Priority Data

Nov. 26, 1992  [JP]  Japan .................... 4-341164

[51] Int. Cl.⁶ ........................................ G06F 12/00
[52] U.S. Cl. .................. 395/442; 395/182.09; 395/821; 364/DIG. 1
[58] Field of Search .................... 395/442, 275, 395/425, 182.09, 821

[56] References Cited

U.S. PATENT DOCUMENTS

| | | | |
|---|---|---|---|
| 4,799,635 | 1/1989 | Nakagawa | 395/442 |
| 4,891,504 | 1/1990 | Gupta . | |
| 5,070,479 | 12/1991 | Nakagawa | 395/575 |
| 5,134,391 | 7/1992 | Okada | 340/799 |
| 5,265,888 | 11/1993 | Yamamoto | 273/434 |
| 5,357,604 | 10/1994 | San et al. | 395/162 |
| 5,393,073 | 2/1995 | Best | 273/434 |
| 5,426,762 | 6/1995 | Nakogawa | 395/425 |

FOREIGN PATENT DOCUMENTS

| | | |
|---|---|---|
| 0206704A2 | 6/1986 | European Pat. Off. . |
| 0449530A2 | 3/1991 | European Pat. Off. . |
| 2-31256 | 2/1990 | Japan . |

Primary Examiner—Christopher B. Shin
Attorney, Agent, or Firm—Nixon & Vanderhye

[57] ABSTRACT

This invention provides an information processing system for a secondary storage medium which can prevent illegitimate reproduction of secondary storage media such as CD-ROMs by allowing only a secondary storage medium in a prescribed relation with a case therefor to be used. A first name data is stored in a secondary storage medium such as a CD-ROM beforehand, while a second name data with a relation with the first name data of the secondary storage medium as well as a name address therefor are stored in a ROM provided in a storage case. When a CPU is activated, it reads the first name data of the secondary storage medium according to the name address and a security element provided in the case compares the first name data with the second name data stored in the ROM. If the security element decides that the two name data have a prescribed relation with each other, a system controller reads a part of the program data stored in the CD-ROM for the inherent object for the image processor and sends it to a main RAM. Then, the CPU runs the program in the main RAM.

15 Claims, 8 Drawing Sheets

INFORMATION PROCESSING SYSTEM WHICH CAN CHECK SECONDARY STORAGE MEDIUM HAVING PRESCRIBED RELATION THEREWITH AND SECONDARY STORAGE DEVICE THEREFOR

BACKGROUND OF THE INVENTION

1. Field of the Invention

The present invention relates to an information processing system which can check a secondary storage medium having a prescribed relation with the information processing system and a secondary storage device therefor. More specifically, the invention relates to an information processing system such as a video game machine, a personal computer or the like which can prevent illegitimate reproduction of a secondary storage medium such as an optical disk used for the image processing system.

2. Description of the Prior Art

In an information processing system such as a video game machine using a secondary storage medium such as an optical disk storing a game program or the like, it is desirable to prevent illegitimate reproduction of information stored on a secondary storage medium. It is also desirable that the authenticity of a secondary storage medium be ensured.

Further, if a secondary storage medium such as an optical disk (a CD-ROM) is used for a video game machine or the like, the storage capacity of CD-ROM is very large and a game can be played for a long time. A user may then need to save backup data at the end of each play in a cartridge for the CD-ROM. In such a case, if a CD-ROM for a different game is inserted in the console of the video game machine when the same game is intended to be started again, the backup data for a different game are written erroneously in the disk cartridge. Therefore, there is a need to prevent such inconsistency of the CD-ROM and the backup data.

U.S. Pat. No. 4,799,635 and Japanese Patent laid open Publication 2-31256/1990 (first and second prior art) of the present applicant disclose techniques for preventing illegitimate reproduction of a program stored in a secondary storage medium. In the technique described in the first prior art, a master semiconductor element is installed in an image processor such as a video game machine, while a slave semiconductor element having a prescribed relation with the master is installed in an external storage device such as a ROM cartridge attached to the video game machine. The master semiconductor element exchanges data with the slave, and when the exchanged data have a predetermined relationship, the central processing unit included in the image processor is activated. Thus, the authenticity is decided by confirming that an external storage device does not include a slave semiconductor element which generates data having a prescribed relation with the master generated data. If it is decided that an external storage device does not include a slave semiconductor element which has the prescribed relation, the external storage device cannot be used.

As to an external storage device wherein a secondary storage medium can be inserted in or removed from a case, the above-mentioned first prior art has a problem that the authenticity of a secondary storage medium cannot be surely decided if a secondary storage medium reproduced illegitimately is contained in a case with a true slave semiconductor element.

In the second prior art reference, a part of the data in a program memory to be read for an inherent object of the program is stored in a monitor ROM in order to prevent reading data from the program memory when not used for the inherent object. If the program memory is used normally, the data sent to the address and data buses are compared with the data stored in the monitor ROM. If the comparison does not result in a match, a memory bank change is not enabled.

In the above-mentioned second prior art, the legitimacy cannot be surely decided if the data read from a program memory for an inherent use includes a conditional branch. Further, the second prior art cannot be applied to a secondary storage medium such as an optical disk which is not a semiconductor memory because the address and data buses cannot be monitored for media other than semiconductor memories.

SUMMARY OF THE INVENTION

An object of the present invention is to provide an information processing system comprising an information processing device and a secondary storage device wherein a secondary storage medium can be inserted or removed from a case therefor, wherein only a secondary storage medium having a prescribed relation with the case is allowed to be used.

A further object of the present invention is to provide a secondary storage device wherein a secondary storage medium can be inserted or removed from a case therefor, wherein the information processing device can prevent illegitimate reproduction of secondary storage media for a secondary storage device by permitting only a secondary storage medium having a predetermined relationship with the information processing device to be used.

An information processing system according to the present invention comprises an information processor and a secondary storage device which can be connected to and disconnected from the information processor. The secondary storage device (optical disk device in an exemplary embodiment described below) comprises a secondary storage medium (CD-ROM in the embodiment), a case (CD case in the embodiment), a non-volatile storage means (ROM in the CD case in the embodiment), a first check means (C-CIM in the embodiment), while the information processor comprises a main storage means (a main RAM), a central processing means (CPU in the embodiment), a write and read means (including a drive, a system controller and a decoder in the embodiment), and an activation means (system controller in the embodiment). The secondary storage medium stores a first data to be processed by the information processor and second data, where the first information data includes at least image data. The case of the secondary storage device can enclose or separate the secondary storage medium. The non-volatile storage means stores a third data having a predetermined relationship with the second data and stores a fourth data identifying the location of the second data in the secondary storage. The main storage means comprises a storage means for writing and reading a data so that at least a part of the first or second data stored in the secondary storage medium can be stored temporarily.

The write and read means reads the first and second data stored in the secondary storage medium before the central processing means in the image processor processes the first data stored in a secondary storage medium, and it writes the read data in the main storage means. The second data is read according to the fourth data stored in the main storage means, while a third data is stored in the non-volatile storage means. The second and third data stored in the secondary storage medium and in the secondary storage device are used to check if the secondary storage medium can be used for the secondary storage device. Preferably, the second and third data comprises a name code data on the secondary storage medium which can be used for the information processing system. Then, a first check means in the secondary storage device decides if a prescribed relation exists between the second data stored in the main storage means and the third data stored in the non-volatile storage means. The prescribed relation is for example the agreement between the two data or that of data obtained after a prescribed operation such as a check sum. When the first check means decides the existence of the prescribed relation, the secondary storage medium is permitted to be used. Then, the activation means enables the central processing means to perform its intended processing thereof according to the first data. Thus, the central processing means performs its inherent processing such as image processing according to the first data stored in the main storage means.

Preferably, the second storage medium such as an optical disk comprises a first storage area for storing the first data, which first storage area having a relatively large storage area, and a second storage area for storing the second data. The first storage area has a relatively small storage area. The main storage means for example may be of a random access memory having a storage capacity smaller than the first storage area.

Preferably, the secondary storage medium comprises an optical storage device such as a CD-ROM having a large storage capacity, and the secondary storage device comprises a case which can enclose and separate the optical storage medium. The case fixes the non-volatile storage means and the first check means. The read means comprises an optical reproduction means for reading storage data of the optical storage medium optically. Thus, the second data in the non-volatile storage means fixed to the case is compared with the third data included in a CD-ROM to be set in the case.

In another aspect of the invention, an information processing system comprises an information processor and a secondary storage device which can be connected to and disconnected from the information processor. The secondary storage device comprising: an optical storage medium as a secondary storage medium for storing a first data to be processed by the information processor and including at least image data, and a second data used for checking a prescribed relation; a case which can enclose and separate the secondary storage medium; a non-volatile storage means for storing a third data with the prescribed relation to the second data and a fourth data on the storage region of the second data in the secondary storage medium; and a first check means for deciding a prescribed relation between the second and third data. On the other hand, the information processor comprises: an image processor, an optical reproduction means and a system cartridge. The image processor comprising at least the central processing means for performing image processing according to the image data stored in the main storage means. The optical reproduction means can be connected electrically to the system cartridge and can be connected to and disconnected from the secondary storage means. The system cartridge comprises a case which can be connected to and disconnected from the image processor, a program storage means for storing a start program for the central processing means, a main storage means for writing and reading a data so that at least a part of the first or second data stored in the secondary storage medium can be stored temporarily, a write and read means for reading the first data, for reading the second data stored in the secondary storage medium according to the fourth data stored in the non-volatile storage means and for writing the read data in the main storage means, and an activation means for enabling the central processing means to perform processing according to the first data when the first check means decides according to the second data stored in the main storage means and the third data stored in the non-volatile storage means that the prescribed relation exists. Thus, the information processing system can check the legitimacy of a secondary storage medium. The information processing system can check the legitimacy of a secondary storage medium by storing the second data having the prescribed relation with the secondary storage device in the secondary storage medium.

Preferably, the optical reproduction means further comprises a second check means for checking the existence of a prescribed relation to the first check means. The activation means enables image processing of the central processing means according to the first data stored in the main storage means if the second check means checks the existence of the prescribed relation with the first check means and the first check means checks the existence of the prescribed check according to the second data stored in the main storage means and the third data stored in the non-volatile storage means. Thus, the information processing system can check the legitimacy of the secondary storage device. Thus, the information processing system can check the legitimacy of the secondary storage device. Preferably, the first and second check means transfer random number data generated according to an initial data to each other, and the prescribed check by the second check means comprises the agreement of the transferred random number data.

An advantage of the present invention is that illegitimate reproduction of a secondary storage medium can be prevented effectively by allowing only a secondary storage medium having a prescribed relation with the secondary storage device to be set.

Another advantage of the present invention is that a secondary storage medium can not be set erroneously in a case for a different secondary storage medium.

A further advantage of the present invention is that illegitimate reproduction of a secondary storage device can be prevented effectively by allowing only a secondary storage device having a prescribed relation with the information processor.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
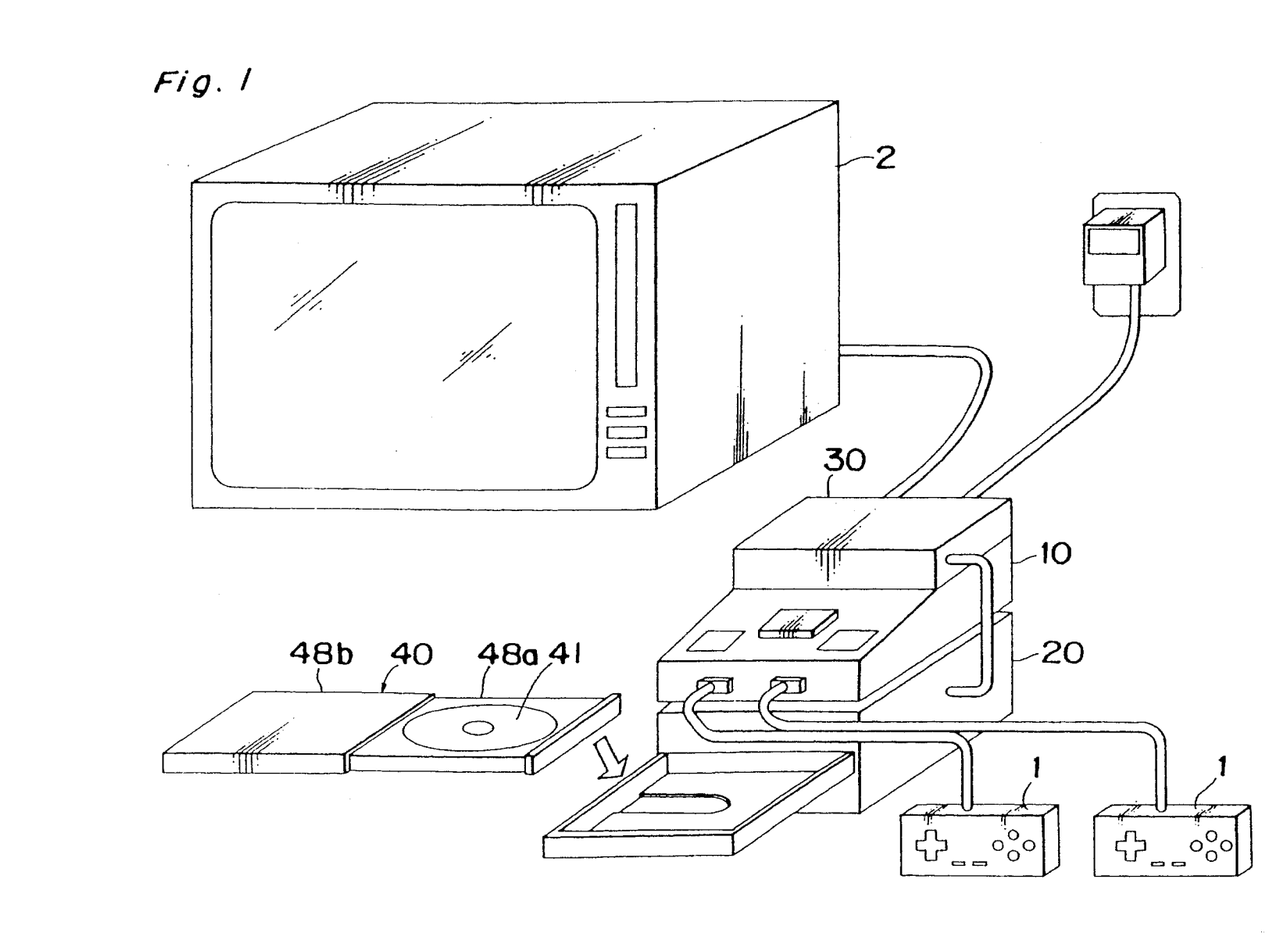
FIG. 1 is a perspective view of an information processing system of an embodiment according to the present invention.

Referring now to the drawings, wherein like reference characters designate like or corresponding parts throughout the several views, FIG. 1 shows a perspective view of an information processing system of an embodiment according to the present invention. The information processing system, comprises an image processor 10, an optical reproduction unit 20 and a system cartridge 30. The image processor 10 performs picture and audio processing and the like based on data given from a ROM cartridge (not shown) or a CD-ROM (secondary storage medium) 41. The optical reproduction unit 20 is connected to the image processor 10 via the system cartridge 30. An optical storage device (hereinafter referred to as "optical disk cartridge") 40 as an example of a secondary storage device can be connected to and disconnected from the optical reproduction unit 20. The optical disk cartridge 40 includes a cartridge case 48 comprising a tray 48a (also see FIG. 3) and a container 48b. As shown in FIG. 1, a CD-ROM 41 is set on the tray 48a to be inserted into the container 48b. Then, as shown in FIG. 1, the optical disk cartridge 40 is put in a sliding case of the optical reproduction unit 20 to be inserted inside the optical reproduction unit 20. Then, the data stored in the CD-ROM 41 can be reproduced.

Figure 2:
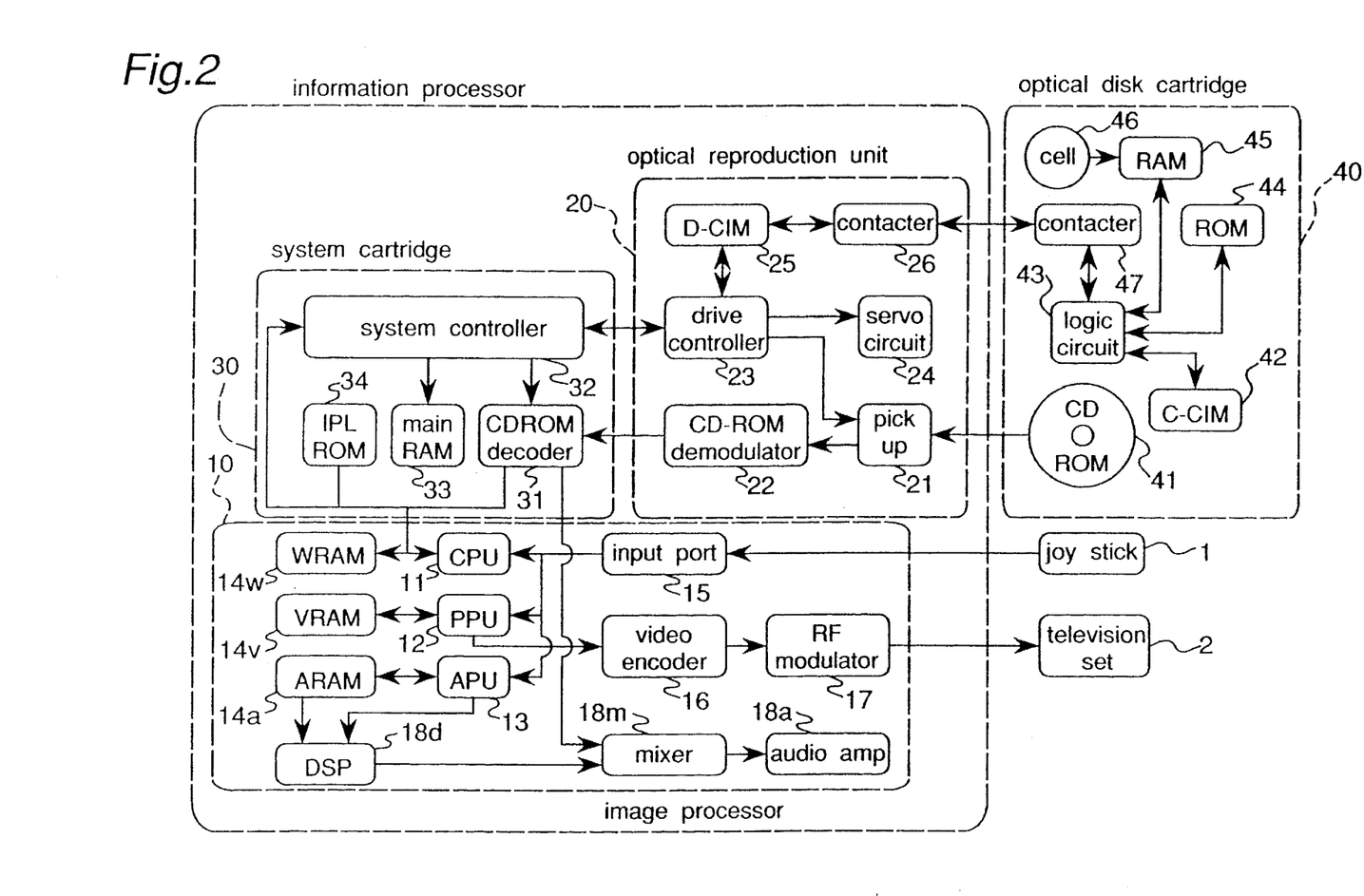
FIG. 2 is a block diagram of the information processing system.

FIG. 2 shows a block diagram of the information processing system. In the system, the image processor 10 performs picture processing and voice processing according to a program data stored in a ROM cartridge (not shown) or from a CD-ROM (a secondary storage medium) 41, to operate as a video game machine. Image processor 10 includes a central processing unit (hereinafter referred to "CPU") 11 to perform game processing or the like. A picture processing unit (hereinafter referred to also as "PPU") 12 and an audio processing unit (hereinafter referred to also as "APU") 13 are connected to CPU 11. The CPU 11 and the picture processing unit 12 cooperate with each other for picture processing in accordance with the stored program. The CPU 11 and the audio processing unit 13 cooperate with each other for audio processing. A working RAM (W-RAM) 14w is connected to the CPU 11. A video RAM (V-RAM) 14v is connected to the picture processing unit 12. An audio RAM 14a is connected to the audio processing unit 13. An operation controlling device (e.g., joy stick) 1 sends operation signals via an input port 15 to the CPU 11. The picture signal output of the picture processing unit 12 are sent to a video encoder 16 and to a high frequency (RF) modulator 17. A digital signal processor (DSP) is connected via address and data buses to the audio processing unit 13 and to the audio RAM 14a. The DSP 18d converts digital data to an analog signal with a waveform and frequencies for outputting a desired audio signal, and sends it via a mixer 18 and an audio amplifier 18a to an RF modulator 17. The RF modulator 17 generates a complex video signal synthesizing a video signal and an audio signal to be provided to a television set 2.

Figure 3:
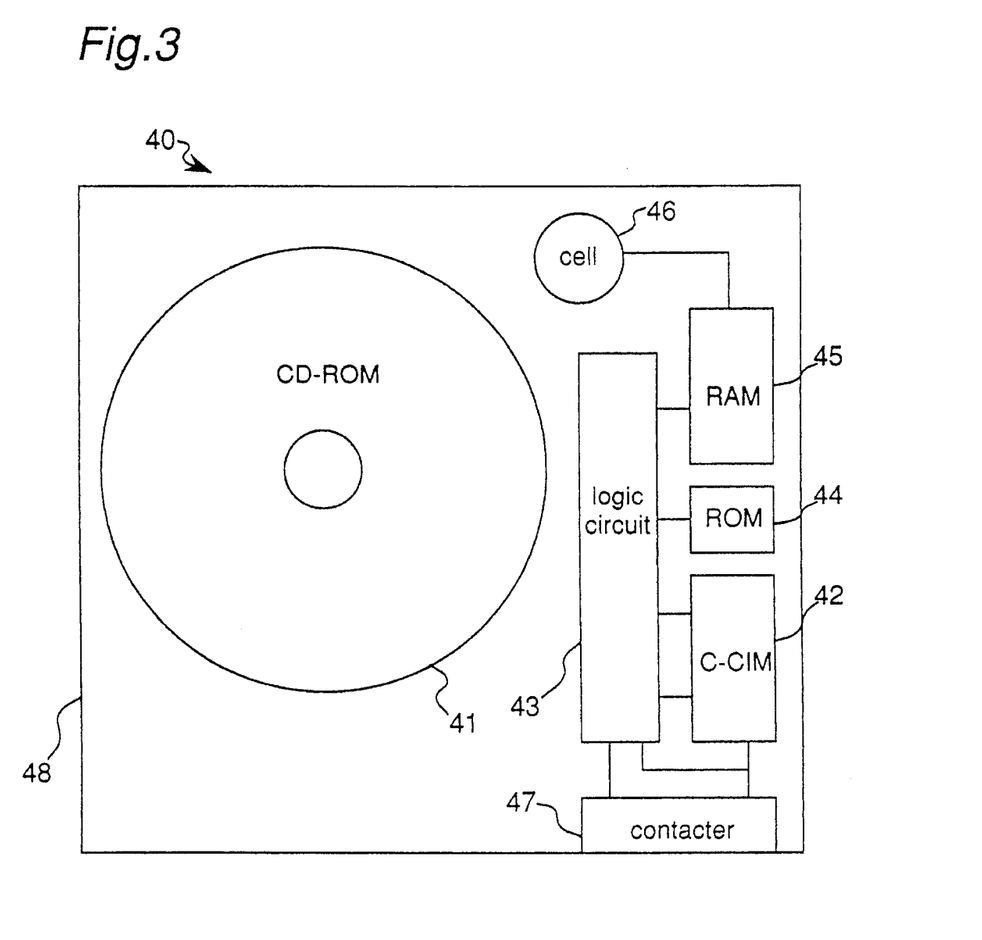
FIG. 3 is a schematic diagram of an optical disk cartridge.

FIG. 3 shows a schematic diagram of an optical disk cartridge 40 which is explained in detail with reference to FIGS. 2 and 3. The optical disk cartridge 40 comprises an optical disk (CD-ROM) 41, as an example of a secondary storage medium, which stores a large amount of data optically. The optical disk cartridge 40 includes a first security element (C-CIM) 42, as an example of the first check means, used for checking the legitimacy of the CD-ROM 41. The first security element 42 comprises a one-chip 4-bit microprocessor or the like, not shown in FIG. 3, including a CPU core, a buffer RAM and a program ROM. A logic circuit 43 is connected to the first security element 42. A non-volatile memory (such as a ROM) 44 stores a first name data (a third data) used for checking the authenticity of the CD-ROM 41 and a name address (a fourth data) for representing the storage address (or area) of the first name data. The first name data comprises a code inherent for each cartridge case 48 which varies with a kind of CD-ROM, a maker thereof, a person having a copy right or the like. The first name data is used to check a prescribed relation with the counterpart (a second name data) stored in the CD-ROM 41. The relation to be checked is, for example, the agreement of the two name data or of two data obtained after a prescribed operation such as check sum of the two name data. A read and write memory (RAM) 45 is connected to the logic circuit 43 in order to store backup data on the points, the progress report and the like during a game. The RAM 45 is backed up with a battery 46 to prevent the destruction of data. Further, a contacter (connection points) 47 is connected to the input and output terminals of the logic circuit 43 so as to provide data to the optical reproduction unit 20 through electrical contact. In the embodiment, the CD-ROM 41 is enclosed in a cartridge case 48 so that the CD-ROM 41 can be contained in or removed from the cartridge case 48. The cartridge case 48 comprises a first security element 42, a logic circuit 43, a ROM 44 and a RAM 45 fixed as one body to the cartridge case 48 so that the contacter 47 can be exposed with a shutter (not shown). If desired, the first security element 42, the logic circuit 43 and the ROM 44 may be integrated in a one-chip integrated circuit.

Referring again to FIG. 2, the optical reproduction unit 20 comprises a pick-up 21 for reading optically the storage data in the optical disk (CD-ROM) 41. The pick-up 21 is provided in a position in correspondence to the CD-ROM 41 when the shutter (not shown) is opened to connect the optical disk cartridge 40 to the unit 20. The pick-up 21 reads image data, program data and acoustic data in the Reed-Solomon code or the like from the CD-ROM 41, and the data are decoded with a decoder (CD-ROM demodulator) 22 respectively. The decoded image data, program data and acoustic data are sent to a decoder (CD-ROM decoder) 31 included in the system cartridge 30. Further, the optical reproduction unit 20 comprises a drive controller 23 for controlling the position of the pick up 21. A servo circuit 24 is connected to the drive controller 23 for the revolution control of the CD-ROM 41, the movement of the pick up and the control of focusing. Further, a contacter (connection points) 26 is connected to the drive controller 23 via a second security element (D-CIM) 25 as an example of the second check means. The second security element 25 comprises a one-chip 4-bit microprocessor or the like including a CPU core, a buffer RAM and a program ROM, similarly to the security element 43. The second security element 25 has a function to decide the authenticity of the first security element 42 and a command generation function to instruct an action of the first security element 42; security element 25 receives a name address from ROM 44 and a back up data from the RAM 45 to send via the drive controller 23 to a system controller 32 to be described later. The second security element 25 is used to check if the optical disk cartridge 40 including the first security element 42 has a prescribed correlation with the optical reproduction unit 20 or not, so that it can decide if the optical disk cartridge is authentically manufactured or not.

The system cartridge 30 is inserted in a cartridge inlet (not shown) of the image processor 10 and provides picture data and audio data received from the optical reproduction unit 20 to the image processor 10. The decoder 31 included in the system cartridge 30 converts the picture data and the program data read in serial from the optical reproduction unit 20 into parallel data and sends them via a system controller 32 to the CPU 11 and decoded audio signals to the mixer 18m.

The system cartridge 30 includes the system controller 32 which controls the optical reproduction unit 20. Further, if the CPU 11 disables the inherent processing according to CD-ROM 41 data in correspondence to a negative decisions by the first security element 42 on the authenticity of CD-ROM 41, the system controller 30 prohibits the reading of various data stored in the CD-ROM 41 eventually. The decoder 31 and the system controller 32 cooperate with the optical reproduction unit 20 to read data from the CD-ROM 41. Further, the system controller 32 functions as a CPU 11 activation means and cooperates with the second security element 25 and the drive controller 23 to control reading and writing. Further, the system cartridge 30 includes a main RAM 33 and a ROM (IPLROM) 34. The ROM (IPLROM) 34 has a storage capacity of for example 2 megabytes and stores an initial program for activating the CPU 11 before reading the CD-ROM 41 data and a system IO for controlling the optical reproduction unit 20 beforehand.

Figure 4:
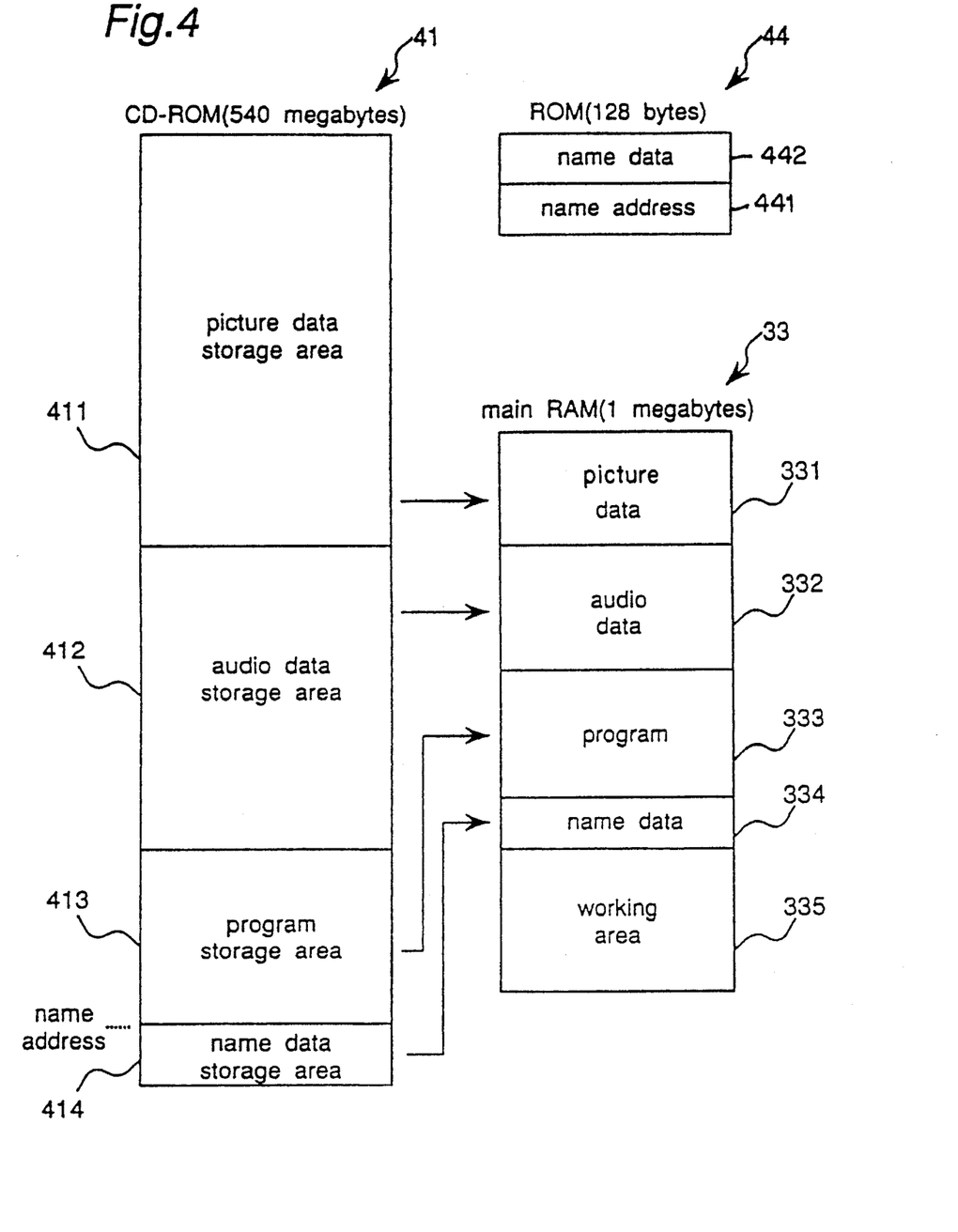
FIG. 4 is a schematic memory maps of CD-ROM 41, ROM 44 and main RAM 33.

FIG. 4 shows schematic memory maps of the CD-ROM 41, the ROM 44 and the main RAM 33. In FIG. 4, the CD-ROM 41 has a very large storage capacity (for example 540 megabytes), and it includes a picture data storage area 411 for storing picture data, an audio data storage area 412 for storing audio data, a program data storage area 413 for storing a program data for the control of a game such as picture image display based on picture data, the generation of audio data and the like, and a name data storage area 414 for storing a second name data. The first data comprises the picture data, the audio data and the program data stored in the storage areas 411–413. The second name data comprises an inherent code of a cartridge case 48 which varies with a kind of CD-ROM 41, a manufacturer, a person having a copyright or the like, and it is used as the second data for checking if it has a prescribed relation (such as the agreement of the name data or check sum thereof) to the name data stored in the ROM 44 for deciding the correlation to the cartridge case 48. The address for storing the name data is called the name address. The name data may also be stored in one of the storage areas 411–413. On the other hand, the name address may be changed for each cartridge case 48 so that CD-ROMs of the same game have different name data.

The ROM 44 has a storage capacity (for example 128 bytes) much smaller than the storage capacity of the CD-ROM 41 and it stores a data for checking the correlation of the CD-ROM 41 to the cartridge case 48. For example, the ROM 44 comprises an area 441 for storing the storage address (fourth data) of a second name data stored in the CD-ROM 41 and an area 442 for storing a second name data (third data) for identifying the CD-ROM 41 which can be used. Therefore, it is sufficient that the first name data stored in the area 442 in the ROM 44 has a prescribed relation (for example the agreement of the two name data or of two data obtained after a prescribed operation thereof) to the second name data stored in the storage area 414. The first name address and the name data may be coded when stored in the ROM 44. An EEP-ROM or a flash memory may be used instead of the non-volatile memory, ROM 44.

The main RAM 33 has a storage capacity (for example 1 megabytes) smaller than that of the CD-ROM 31 and but not so small to be needed to transfer data frequently for image processing. The main RAM 33 stores a unit of data needed for picture processing and audio processing temporarily according to the usage requirements such as in a game. For example, the main RAM 33 includes a storage area 331 for storing picture data, a storage area 332 for storing audio data, a storage area 333 for storing program data and a storage area 334 for storing a second name data read from the CD-ROM 41 temporarily. The main RAM 33 is used as a main storage means and it stores the first data in the storage areas 331–333 and the second data in the storage area 334.

Figure 5:
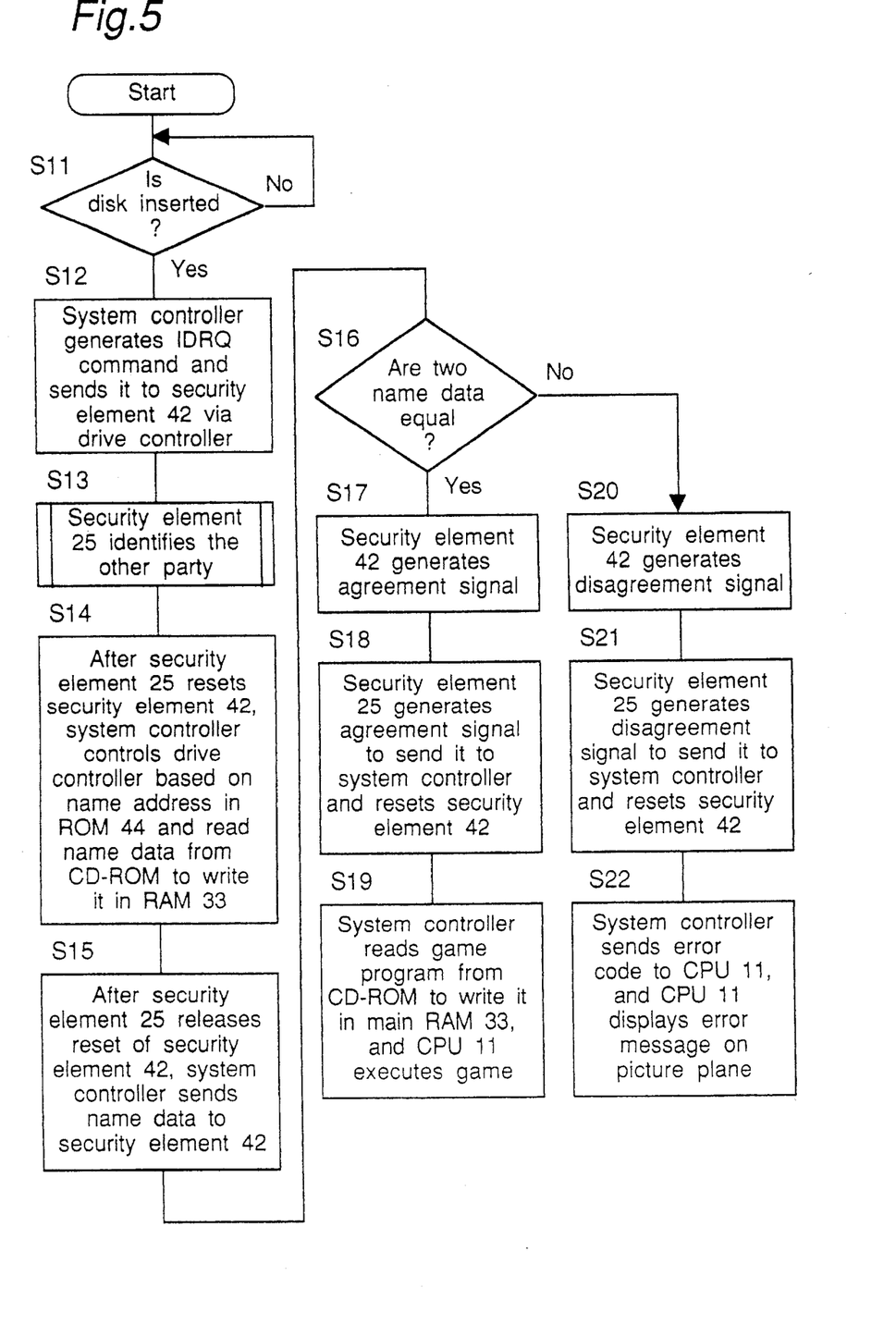
FIG. 5 ia a flowchart for starting the system.

FIG. 5 shows a flowchart for starting the data processing system. That is, FIG. 5 shows operational flow on the check of permission of the use of a CD-ROM 41 when the optical disk cartridge 40 containing the CD-ROM 41 is set in the optical reproduction unit 20. The system controller 32 starts the operation of FIG. 5 according to the program stored in the ROM 34.

At step S11, it is decided if an optical disk cartridge 40 is inserted in the optical reproduction unit 20. If it is decided that an optical disk cartridge 40 is not inserted, the operational flow waits the insertion. If it is decided that an optical disk cartridge 40 is inserted, the flow proceeds to a next step S12. At step S12, the system controller 32 sends a command IDRQ for requesting the identification of the other party to the second security element 25. At step S13, the second security element 25 decides if the first security element 42 having a prescribed relation to a cartridge case 48 exists or if the cartridge case 48 set in the optical reproduction unit 20 is manufactured legitimately or not. This decision is shown in detail in the flowchart shown in FIG. 6 on the identification of the other party.

Figure 6:
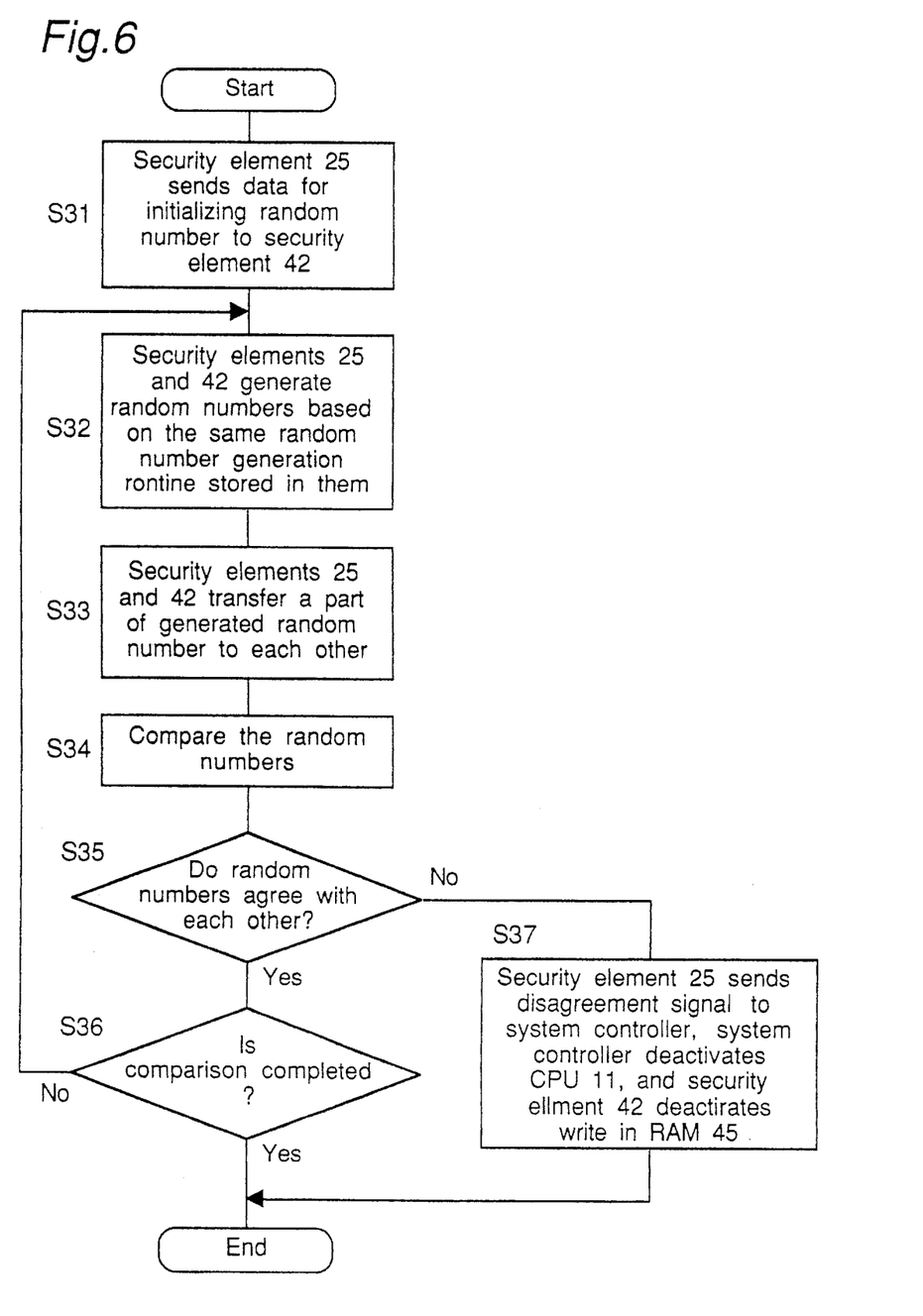
FIG. 6 is a flowchart for identifying the other party.

In FIG. 6, at step S31, the second security element 25 sends initial data for generating random numbers to the first security element 42. At step S32, the two security elements 25 and 42 generate one or more data of random number based on the same initial data. At step S33, the second security element 25 transfers a half of the generated random number data to the other party 42, while the other security element 42 transfers the other half of the generated random number data to the other party 25. At step S34, the security elements 25 and 42 compare and check the received data with those generated by themselves. At step S35, it is decided if the result of the comparison shows the prescribed relation of the data such as agreement. If it is decided that the agreement of the data or the like is confirmed, the flow proceeds to step S35 to decide if the comparison and check is performed at prescribed times. If it is decided that the comparison and check are not repeated the prescribed times, the flow returns to step S32 so as to repeat the operation of steps S32–36. At step S36, if it is decided that the comparison and check is repeated the prescribed times, the flow of the identification process is completed.

On the other hand, if it is decided at step S35 that the result of the comparison does not show the agreement of the data, the second security element 25 sends a signal of the disagreement to the system controller 32. Then, the system controller 32 disables the CPU 11 to prohibit the reading of the data in the CD-ROM 41. In this case, a message may be displayed on a picture plane of the television set 2 to warn that the picture processing and/or audio processing cannot be conducted by using the data in the CD-ROM 41. Alternately, the system controller 32 may sends a signal to the first security element 42 to prohibit the writing of back-up data in the RAM 45.

After the completion of the identification of the other party shown in FIG. 6, the flow proceeds to step S14 in FIG. 5. At step S14, the system controller 32 reads a name address data stored in the area 441 in the ROM 44, and reads a second name data at an address in the CD-ROM 41 in correspondence to the name address by controlling the drive controller 23 and writes the second name data in the storage area 334. At step S15, the system controller 32 sends the second name data stored temporarily in the storage area 334 via the drive controller 23, the second security element 25, the contacter 26, the contacter 47 and the logic circuit 43 to the first security element 42. Then, at step S16, the first security element 42 compares and checks the received name data with the first name data stored in the area 442 in the ROM 44 and decides if the two data have a prescribed relationship such as the agreement of the two data to each other. If it is decided that the two data have the prescribed relationship with each other, the first security element 42 sends an agreement signal to the second security element 25 at step S17. At step S18, the second security element 25 sends the agreement signal to the system controller 32 and resets the first security element 42 thereafter continuously. The second security element 25 may identify the other party again after the comparison because this makes it more difficult to analyze which is the name data among the above-mentioned input and output data. At step S19, the system controller 32 reads a part of the picture data, the audio data and the program data (that is, data within the storage capacity of the main RAM 33) optically with the pick up 21. These data are demodulated by the CD-ROM demodulator 22, decoded by the decoder 31 and written in the main RAM 33. Then, CPU 11 starts the game processing as shown in FIG. 7 by accessing the main RAM 33.

On the other hand, at step S16, it is decided that the disagreement (or the non-existence of the prescribed relation) of the two name data exists, the flow proceeds to step S20. At step S20, the first security element 42 sends a disagreement signal to the second security element 25. At step S21, the second security element 25 sends the disagreement signal to the system controller 32 and resets the first security element 42 thereafter continuously. At step S22, the system controller 32 sends an error code to the CPU 11, and the CPU 11 is disabled so as not to conduct picture processing and the like based on the data read from the CD-ROM 41. Under such circumstances, the CPU 11 displays an error message on the television set 2 to warn a user that the optical disk cartridge 40 cannot be used.

Figure 7:
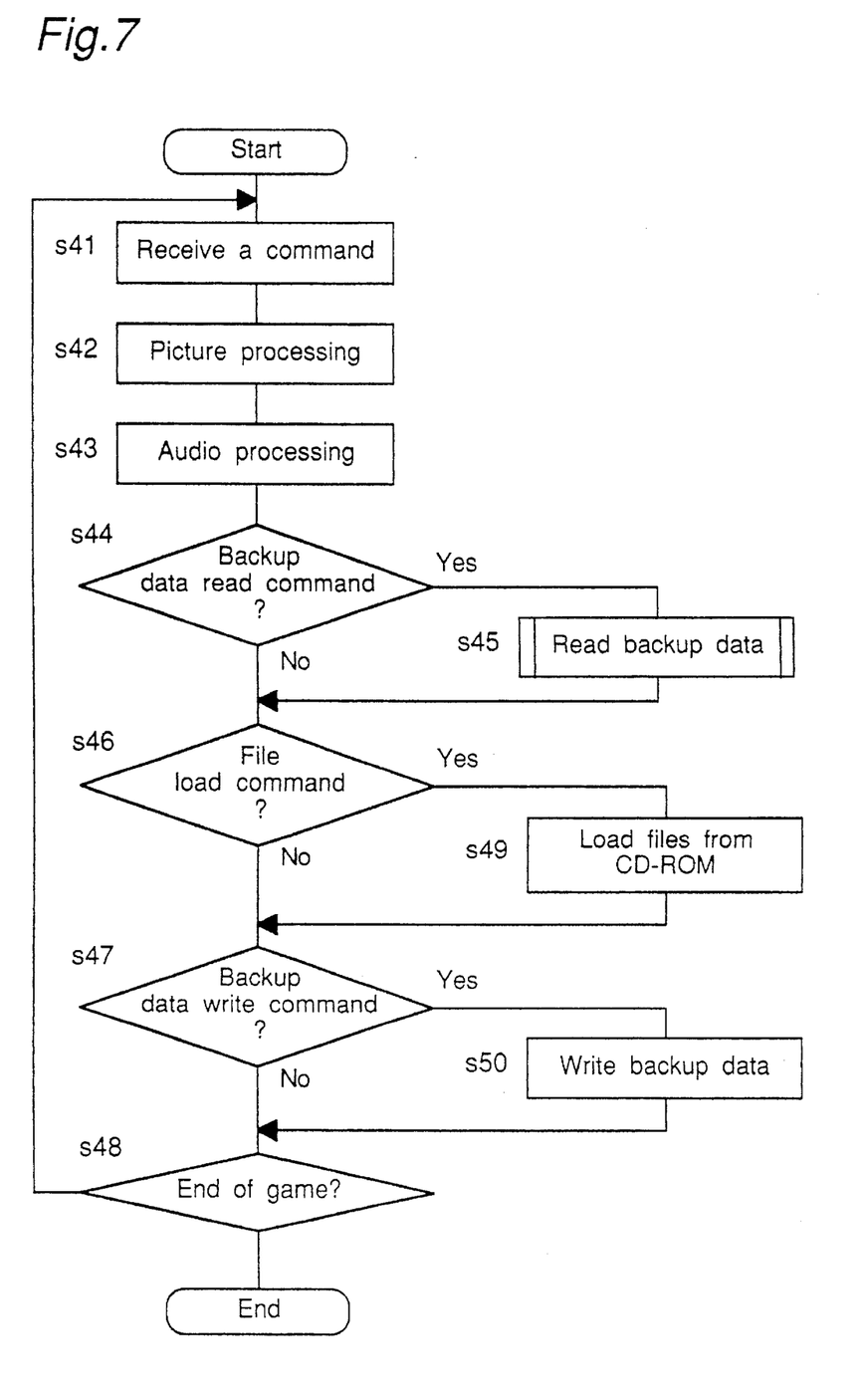
FIG. 7 is a flowchart for performing for the very object to be used (main routine) of CPU 11.
Figure 8:
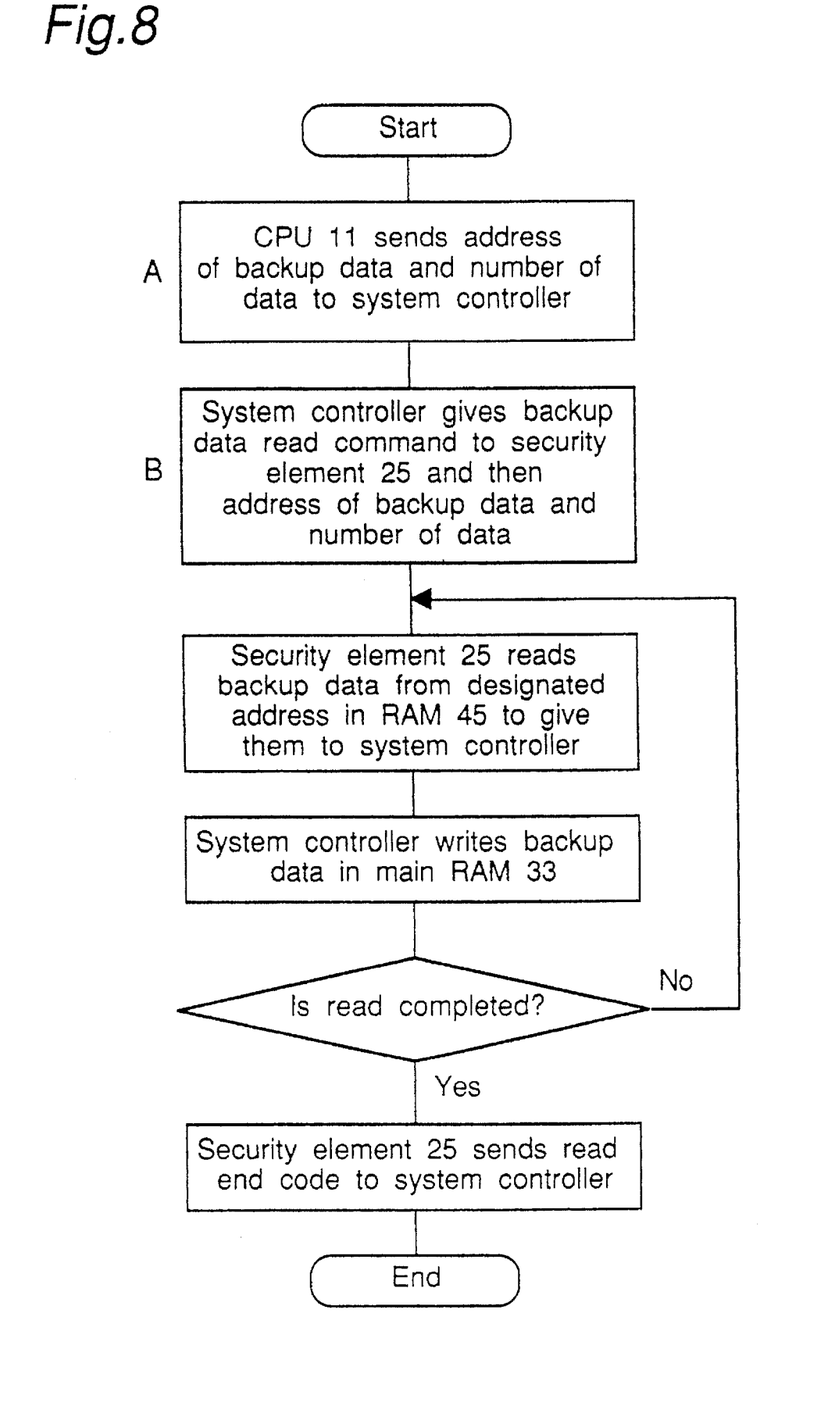
FIG. 8 is a flowchart for controlling read of backup data.

FIG. 7 shows a flowchart for performing for the inherent object processing to be used (main routine) for CPU 11. Because the information processing system of the present embodiment is a video game machine, the inherent processing relates the processing of a game program. Next, by referring FIG. 7, an example is explained of game processing such as picture processing and audio processing to which the present invention is applied. At step S41, a player inputs a command by operating the joy stick 1 to select a game mode displayed on the picture plane of the television set 2. At step S42, the CPU 11 conducts processing for the game or the like based on the program data stored temporarily in the main RAM 33, while the picture processing unit 12 generates picture signals for the game based on picture data. At step S43, the audio processing unit 13 generates audio signals based on audio signals. Thus, a game proceeds by displaying image signals based on the picture on the television set 2 with audio signals. At step S44, it is decided if a command to be processed is a read command of backup data. If a player wants to restart the game by using the back up data (for example, points, lives or the present situation) at the end of the previous play, the read command of back up data is generated, and the flow proceeds to step S45. At step S45, the CPU 11 reads the data in the midst of the game stored in the RAM 45 in the cartridge case 48, and stores them in the storage area 335 as a working area. The control of reading back up data is shown in detail in a flowchart of FIG. 8, but detailed explanation thereof is omitted here.

On the other hand, at step S44, if the command for reading the back up data does not exist, the flow proceeds to step S46. It is decided at step S46 if a file load command does not exist, and it is decided at step S47 if a write command of back up data does not exist. If it is decided at step S48 that the game is not over, the flow returns to step S41 to repeats the processing of steps S41, S46–S48. Thus, the CPU 11, picture processing unit 12 and audio processing unit 14 conduct the processing for the game based on the data stored temporarily in the main RAM 33. If the processing in correspondence to the storage capacity of the main RAM 33 (for example 1 megabytes) is conducted, a file load command is detected at step S46 because the file load command is written at the end of the program. Then, the CPU 11 proceeds to step S49 to read picture data, audio data and program data (of total of 1 megabytes) necessary for the next game processing and to write them in the storage areas 331–333 in the main RAM 33. Such processing is similar to the above-mentioned processing of steps S19 and S14–S19.

At step S47, if a write command of back up data is detected, a write processing of backup data is conducted at step S50. If an optical disk cartridge 40 is constructed and the backup data are written as in this embodiment, even when a CD-ROM 41 is inserted in an optical disk cartridge 40 for a different game, it can be prevented that backup data of the different game is written erroneously in the RAM 45 in the optical disk cartridge 40 not in correspondence to the backup data. Then, at step S48, if it is decided that the game is over or that the player presses the end switch to instruct the end of the game, the game processing is completed.

In the embodiment explained above, the image processor 10, the optical reproduction unit 20 and the system cartridge 30 are contained in different housings, because it is assumed that the optical reproduction unit 20 and the system cartridge 30 are sold later to connect them to a video game machine, as a part of the information processing system, which has been previously bought by a user.

As explained above, the present invention makes it possible to use only a legitimate secondary storage device which has a prescribed relation with a case thereof among secondary storage devices which can be contained in the cartridge case. Thus, illegitimate reproduction of a secondary storage medium can be prevented effectively.

Although the present invention has been fully described in connection with the preferred embodiments thereof with reference to the accompanying drawings, it is to be noted 10 that various changes and modifications are apparent to those skilled in the art. Such changes and modifications are to be understood as included within the scope of the present invention as defined by the appended claims unless they depart therefrom.

What is claimed is:

1. An information processing system comprising an information processor and a secondary storage device which is removably connected to the information processor, said secondary storage device comprising:

a secondary storage medium for storing a first data, processed by the information processor and including at least image data, and a second data;

a case which contains the secondary storage medium;

a non-volatile storage device for storing a third data having a predetermined relationship with the second data and storing a fourth data for identifying a location in the secondary storage medium at which the second data is stored; and a first checking circuit for determining the existence of the predetermined relationship between the second and third data;

said information processor comprising;
- a random access memory for writing and reading image data;
- a central processor for performing image processing according to the image data stored in the random access memory;
- write and read circuitry for reading the first data, for reading the second data stored in the secondary storage medium in accordance with the fourth data stored in the non-volatile storage device and for writing the first data and the second data to the random access memory; and
- an activation circuit for enabling the central processor to perform processing according to the first data when the first checking circuit decides according to the second data stored in the random access memory and the third data stored in the non-volatile storage device that the predetermined relationship exists, said secondary storage medium comprising an optical storage device, said secondary storage device case enclosing said secondary storage medium, and housing said non-volatile storage device and said first checking circuitry, said read circuitry comprising optical reproduction circuitry for optically reading storage data in said optical storage medium.

2. The information processing system according to claim 1, wherein said second and third data comprises name code data on the secondary storage medium.

3. The information processing system according to claim 1, wherein said predetermined relationship comprises complete agreement of said third data with said second data.

4. The information processing system according to claim 1, wherein a check sum operation is performed on each of said second data and said third data and wherein said predetermined relationship requires the agreement of a check sum of the third data and a check sum of said second data.

5. The information processing system according to claim 1, wherein said information processing system comprising:
- a first storage area for storing said first data, which first storage area having a relatively large storage area; and
- a second storage area for storing said second, which first storage area having a relatively small storage area;
- said random access memory having a storage capacity smaller than the first storage area.

6. The information processing system according to claim 1, wherein said secondary storage medium comprises a CD-ROM.

7. An information processing system comprising an information processor and a secondary storage device which is removably connected to the information processor, said secondary storage device comprising:
- a secondary storage medium for storing a first data, processed by the information processor and including at least image data, and a second data, which secondary storage medium comprising an optical storage medium;
- a case which encloses the secondary storage medium;
- a non-volatile storage device for storing a third data having a predetermined relationship with the second data and storing fourth data for identifying a location in the secondary storage medium at which the second data is stored; and
- a first checking circuit for determining the existence of the predetermined relationship between the second and third data;

said information processor comprising:
- an image processor, optical reproduction circuitry and a system cartridge;
- the image processor including a central processor for performing image processing according to the image data stored in a main storage device;
- said optical reproduction circuitry being coupled to a system cartridge and connected to said secondary storage means;

the system cartridge comprising:
- a case which is removably connected to the image processor, a program memory for storing a startup program for said central processor, write and read circuitry for reading the first data, for reading the second data stored in the secondary storage medium in accordance with the fourth data stored in the non-volatile storage device and for writing the first data and the second data in the main storage device, and an activation circuit for enabling the central processor to perform processing according to the first data when the first checking circuit decides according to the second data stored in the main storage device and the third data stored in the non-volatile storage device that the predetermined relationship exists.

8. The information processing system according to claim 7, said optical reproduction circuitry further comprising a second checking circuit for checking the existence of said predetermined relationship with said first checking circuit; said activation circuit enabling image processing by said central processor according to the first data stored in said main storage device if the second checking circuit determines the existence of the predetermined relationship with said first checking circuit and performs a prescribed check according to the second data stored in said main storage device and the third data stored in said non-volatile storage device.

9. The information processing system according to claim 8, wherein said first and second checking circuit transfer to each other random number data generated according to initial data and said prescribed check by said second checking circuit comprises determining the existence of a predetermined relationship between the transferred random number data.

10. A secondary storage device which is removably connected to an information processor, said information processor comprising:
- a main storage device for reading and writing data;
- a central processor for performing image processing according to the data stored in the main storage device;
- write and read circuitry for reading data from and writing data to said main storage device;
- control circuitry for controlling the write and read circuitry; and
- an activation circuit for enabling the central processor to perform image processing;

said secondary storage device comprising:
- a secondary storage medium for storing first information data processed by the information processor and second data for checking the authenticity of the first information data, said first information data including at least image data;
- a case which encloses the secondary storage medium;
- a non-volatile storage device for storing a third data having a predetermined relationship with said second data and a fourth data for identifying the location in the secondary storage medium at which the second data is stored; and a first checking circuit for determining the existence of said predetermined relationship between the second and third data;

said secondary storage medium comprising an optical storage device, said secondary storage device case enclosing said secondary storage medium, and housing said non-volatile storage device and said first checking circuitry, said read circuitry comprising optical reproduction circuitry for optically reading storage data in said optical storage medium;

said control circuitry causing said write and read circuitry to read the second data from the secondary storage medium, said activation circuitry enabling said central processor to perform image processing in accordance with the first data in response to a determination by the first checking circuit that the predetermined relationship exists between the second data and the third data stored in said non-volatile storage device.

11. The secondary storage device according to claim 10, wherein said second and third data comprises a name data.

12. The information processing system according to claim 10, wherein said predetermined relationship comprises complete agreement between said third data and said second data.

13. The secondary storage device according to claim 10, wherein a check sum operation is performed on each of said second data and said third data and said predetermined relationship requires the agreement of a check sum of the third data and said second data.

14. The secondary storage device according to claim 10, wherein said optical storage medium comprises an optical disk.

15. The secondary storage device according to claim 14, wherein said optical disk comprising a CD-ROM.

* * * * *